ns
3,172,479
HYDRAULIC POWER LIFT MECHANISM
FOR TRACTORS
Herbert Edward Ashfield, Charles Hartley Hull, and Harry Horsfall, all of Meltham, Huddersfield, England, assignors to David Brown Tractors (Canada) Limited, a corporation of Canada
Filed June 22, 1961, Ser. No. 118,961
Claims priority, application Great Britain, June 29, 1960, 22,709/60
13 Claims. (Cl. 172—7)

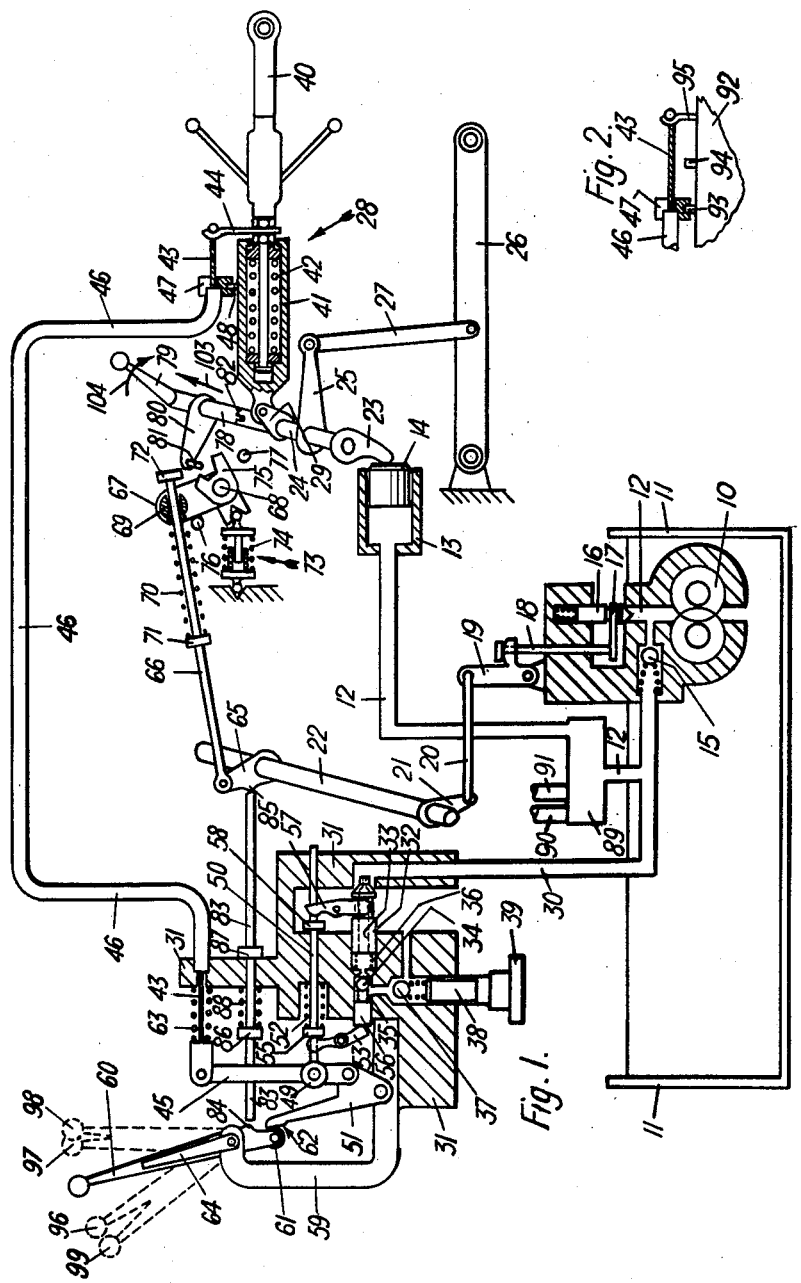

The invention relates to an improvement in or modification of that forming the subject of application No. 9,472, now Patent No. 3,120,278.

In the specification accompanying application No. 9,472, now Patent No. 3,120,278, there is described a hydraulic power lift mechanism, for a tractor or the like, wherein the working depth of an implement hitched to the tractor or the like is adapted to be automatically controlled by the draft force exerted on the implement, said mechanism being provided with means adapted to maintain a predetermined minimum pressure in the hydraulic system. In a preferred embodiment of said hydraulic power lift mechanism, there is provided a pump adapted to deliver liquid under pressure to a hydraulic cylinder, and valve means controlled by a hand lever and also operable automatically by variations in the draft force exerted by the tractor or the like on an implement hitched thereto, to control the flow of liquid to further valve means adapted to maintain a predetermined minimum pressure in the hydraulic system. However, the pressure of setting of said hydraulic power lift mechanism tends to fluctuate in accordance with variations in the quantity of oil flowing through the first mentioned valve means, or with variations in the viscosity of the oil. Furthermore, the rate of the first mentioned valve means is not constant, so that the response of the system to varying draft forces is not constant at different pressure settings.

One object of the present invention is to substantially overcome these disadvantages. A further object is to enable the pressure in the system to be reduced automatically to zero if the draft force diminishes to an excessive extent. Yet another object of the invention is to provide a controlled rate of drop for an implement or other mechanism actuated by an auxiliary hydraulic cylinder capable of being fed with liquid under pressure by the pump.

According to the invention, apparatus for combination with a tractor adapted to have an implement hitched thereto and having mechanism for raising and lowering said implement between idle and working positions respectively, comprises a power driven pump connected into a substantially closed hydraulic circuit, hydraulic means adapted to be operably connected to said implement raising and lowering mechanism and connected to be actuated by liquid pressure at the discharge side of the pump, a slide valve in aid circuit for controlling the escape of liquid from said cylinder to sump, a spring-closed pilot valve for controlling the pressure drop across said slide valve, means for controlling the force of the spring of said pilot valve in response to variations in the draft force exerted by the tractor on an implement hitched thereto, and valve means adapted to maintain a predetermined minimum pressure in said hydraulic means.

A preferred embodiment of the invention will now be described, by way of example only, with reference to the accompanying drawings, of which:

FIG. 1 is a diagrammatic view of a tractor hydraulic power lift mechanism.

FIG. 2 is a detail view hereinafter referred to;

Figure 3:
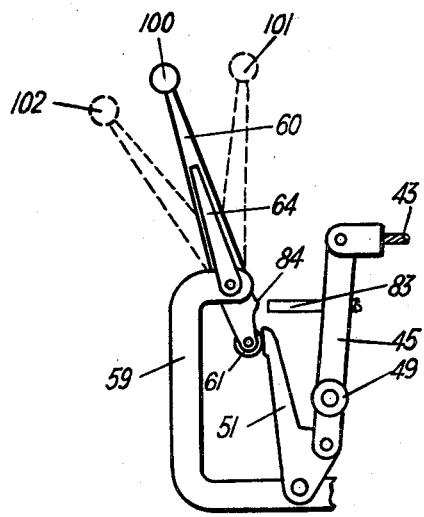
FIG. 3 shows alternative positions of control means for the mechanism.

Referring now to the drawings, a hydraulic power lift mechanism of an agricultural tractor includes a pump 10 which draws oil from a sump 11 and communicates on its delivery side, by way of a conduit 12, with a single-acting hydraulic cylinder 13 containing a ram 14. A non-return valve 15 is disposed in the conduit 12, and an opening is provided in the said conduit on the pump side of the non-return valve 15. This opening is adapted to be closed by a spring-loaded valve member 16 which is provided with an axial bleed hole (not shown) to conduct oil under pressure to the rear of the valve, and said valve member is so dimensioned that the hydraulic pressure in the closing direction is equal to that in the opening direction. The valve member 16 has a portion of reduced diameter with which engages a fork 17 carried by a rod 18 which is operable through a bell crank lever 19 connected by a rod 20 to an arm 21 fixed on a shaft 22 adapted to be oscillated about its axis by means hereinafter referred to. The connection between the rod 18 and the bell crank lever 19 is such that movement of the bell crank lever in one direction opens the valve member 16 whilst movement of said lever in the other direction does not itself close the valve member but permits it to be closed by its associated spring. The ram 14 is adapted to act on an arm 23 fixed to a shaft 24 extending laterally across the rear of the tractor, and the shaft 24 can thus be rocked to cause two laterally spaced lift arms 25 rigidly carried by said shaft to swing a pair of laterally spaced links 26 in an upward direction about their points of pivotal connection to the tractor by means of respective lift rods 27. For the sake of clarity, only one lift arm and its associated link and lift rod are shown in FIG. 1. A central, upper link indicated generally at 28 is pivotally connected at its front end to a short arm 29 rigidly connected to the shaft 24. Thus an implement hitched to the rear ends of the two links 26 and of the links 28 can be raised to an inoperative position.

Connected to the conduit 12, between the non-return valve 15 and the cylinder 13, is a conduit 30 communicating with a valve housing 31 in which there is located a slide valve 32 provided with an axial bleed hole 33 through which oil can communicate with a pilot valve comprising a ball 34 urged in the closing direction by a spring 35. The slide valve 32 is adapted to be closed by a spring 36, and is so dimensioned that when it is open the forces exerted on it in opposite directions balance each other out in known manner. Said valve 32 is operable to prevent or permit the escape of oil from the conduit 30 to the sump 11, and the pressure drop across said valve 32 is controlled by means hereinafter described for varying the force of the spring 35 acting on the ball 34. From the rear of the pilot valve 34 a conduit communicates with an adjustable relief valve consisting of a spring-loaded ball 37 and a screwed adjusting member 38 having a hand wheel 39. A spring-loaded ball (not shown) located in a bore in the housing 31 is adapted to engage with axial grooves (not shown) in the member 38 so that the operator can readily adjust the relief valve by any determined amount indicated by the number of times said ball is felt to engage in a groove. From the rear of the ball 37 a conduit communicates with the sump 11. The arrangement is such that when the pressure acting on the pilot valve 34 exceeds the closing force exerted on the ball 34 by the spring 35, the oil lifts said ball from its seat and unbalances the slide valve 32, which thus opens to permit the escape of oil from the conduit 30 to the sump 11 at a controlled rate, that is to say the pressure drop across the slide valve 32 is dependent on the force of the spring 35. However, the adjustable relief valve 37 connected in series with the pilot valve is operable to maintain a predetermined minimum pressure in the conduit 30, independently of variations in the force of the spring 35, except in exceptionally light working conditions as hereinafter explained. Due to the provision of the pilot valve 34, the pressure in the system is not affected by variations in the quantity of oil flowing through the slide valve 32 nor is it substantially affected by variations in the viscosity of the oil, and since the rate of the spring 35 within its working limits is virtually constant, the rate of the slide valve 32 is virtually constant.

The force of the spring 35 can be controlled by a Bowden cable connected to the central, upper link 28 previously referred to. This is achieved by making the said link of two mutually telescopic parts 40 and 41 between which there is located a compression spring 42 adapted to resist both lengthening and shortening of the link 28 from an intermediate or nominal length. The part 41 is pivotally connected to the arm 29 on the shaft 24 journalled on the tractor, and the part 40 is movable axially relative to the part 41, against the action of the spring 42, by any increase or decrease in the draft force exerted on an implement (not shown) connected to the tractor by means of the two links 26 and of the part 40 of the link 28. So-called Bowden cable is well known and comprises a flexible wire extending slidably through a flexible tubular casing. The wire 43 of the Bowden cable is connectible at one end to a projection 44 rigidly mounted on the part 40 of the link 28 and at the other end to one end of a lever 45, whilst the casing 46 which surrounds the wire 43 abuts at one end against the valve housing 31 and is located at the other end by an abutment 47 engageable on a peg 48 rigidly mounted on the part 41 of the link 28. The lever 45 is provided, intermediate its ends, with a roller 49 adapted to bear against one end of a rod 50 slidable in a bore in the valve housing 31, and is pivotally connected at its end remote from the Bowden cable to a member 51 pivoted on said valve housing. The rod 50 is urged towards the roller 49 by a spring 52, and a toggle lever 53 pivotally mounted on the valve housing 31 engages at one end with a flange 55 near that end of the rod 50 adjacent the roller 49, whilst the other end of said toggle lever abuts against the outer end of a plunger 56 the inner end of which bears against the spring 35. Another toggle lever 57 pivotally mounted within the valve housing 31 engages at one end with an annular groove in the periphery of the slide valve 32 and is engageable at its other end by a flange 58 on the rod 50. Pivoted on an arm 59 extending from the valve housing 31 is a hand lever 60 carrying a roller 61 adapted to bear against a surface 62 on the member 51. The spring 52, which is stronger than the spring 35, acts to stabilise the lever 45 and the member 51, assisted by a light compression spring 63 on the wire 43. Friction means (not shown) are provided at the pivot of the hand lever 60 to hold said lever in any desired position against the action of the spring 52. A datum lever 64 is also pivoted on the arm 59 about the same axis as the lever 60, and is likewise held in any desired position by the said friction means, with a greater force than that which holds the lever 60. The datum lever 64 bears two marks (not shown), and can be adjusted to bring one or the other of the said marks into alignment with a mark on the arm 59 for reasons hereinafter referred to. In order to differentiate between the marks on the datum lever, the word "hold" is stamped adjacent one of the marks and the words "weight transfer" are stamped adjacent the other.

The shaft 22 has fixed to it an arm 65 which is pivotally connected to one end of a rod 66, the other end of which is connected by lost motion means to an arm 67 pivotable about a fixed axis 68. The said lost motion means comprise a stud 69 rotatably connected to the arm 67 and having a diametrical bore in which the rod 66 is slidable. A compression spring 70 is located between the stud 69 and a flange 71 on the rod 66, and the rearward end of the rod 66 is provided with another flange 72. An over-centre device indicated generally at 73, and including a coil spring 74, is associated with the arm 67, and a cam member 75 is rigidly connected to said arm. Stops 76 and 77 are provided to limit angular movement of the arm 67. An axially movable shaft 78 carries rigidly a selector lever 79 and an arm 80 carrying a peg 81 adapted to engage with the cam member 75. The shaft 78 is co-axial with the shaft 24 and is adapted to be drivably coupled thereto by means of a tongue and groove connection 82.

A rod 83 is slidable longitudinally in the valve housing 31 and is adapted to abut at one end against a projection 84 on the hand lever 60 and at the other end against a projection 85 on the arm 65. Said rod has two fixed flanges 86 and 87 located on opposite sides of the valve housing 31, and a compression spring 88 is located between the flange 86 and the valve housing.

A valve chest 89 is disposed in the conduit 12 between the cylinder 13 and the junction with the conduit 30, and contains conventional manually-operated means (not shown) for selectively admitting oil either to the cylinder 13 or through either of the conduits 90 and 91 to an auxiliary hydraulic cylinder (not shown).

Rigidly mounted on a fixed part 92 of the tractor are two pegs 93 and 94 upon either of which there can be located the abutment 47 for that end of the casing 46 of the Bowden cable which is remote from the valve housing 31. Also rigidly mounted on said fixed part is a projection 95 to which there can be connected that end of the wire 43 which is remote from the lever 45. The parts 92–95 are shown in FIG. 2 of the drawing.

The slide valve 32 and the pilot valve act to limit the maximum pressure in the system to a safe permissible value.

The manner of operation as a depth control system is as follows:

The shaft 78 is drivably coupled to the shaft 24, the abutment 47 is engaged on the peg 48, the wire 43 is connected to the projection 44 and communication is established through the valve chest 89 between the pump 10 and cylinder 13. When an implement (not shown) connected to the two links 26 and to the link 28, and not provided with its own depth-regulating means, is in working position, the valve member 16 is closed and the hand lever 60 is in such a position as to maintain the implement at the desired working depth by permitting the pilot valve constituted by the ball 34 and spring 35 to open and thus unbalance the slide valve 32 so that said slide valve opens to an extent sufficient to maintain a predetermined pressure drop from the conduit 30 to the sump 11. FIG. 1 illustrates the mechanism in these conditions, the hand lever 60 and datum lever 64 being shown in full lines in a typical position. If any variation occurs in the draft force exerted on the implement, the central, upper link 28 either lengthens or shortens with the result that the lever 45 connected to the wire 43 pivots about its point of connection to the member 51 and acts through the roller 49, rod 50, toggle lever 53 and plunger 56 to increase or decrease the force of the spring 35 and thus to vary the closing force acting on the slide valve 32 so as to vary the axial position of, and the pressure drop across, said slide valve. A decrease in draft force will extend the central, upper link 28 and reduce the pressure drop across the slide valve 32 thereby reducing the pressure in the cylinder 13 and permitting the working depth of the implement to increase. Conversely, when an increase in draft force occurs, the mechanism operates to reduce the working depth of the implement. Within the normal operating range of draft forces, the pressure in the system cannot fall below a minimum value determined by the setting of the screwed adjusting member 38 of the adjustable relief valve comprising the spring-loaded ball 37. Said relief valve maintains a predetermined minimum pressure at the rear of the slide valve 32, and thus prevents unbalancing of said slide valve to an extent where the pressure in the system would fall below the desired minimum. Thus, there is normally always a certain amount of weight being transferred from the implement to the tractor to reduce any tendency for the driving wheels of the tractor to spin, said amount being proportional to the pressure in the system. However, if the draft force diminishes to an excessive extent the movement imparted to the rod 50 by the roller 49, against the action of the spring 52, causes the flanges 58 on said rod to contact the toggle lever 57 and move said toggle lever pivotally so as to throw the slide valve 32 fully open by mechanical means irrespective of the pressure at the rear of said slide valve. Thus the pressure in the system is automatically reduced to zero and the implement can descend to its maximum working depth.

Variations in the working depth of the implement are effected by the driver moving the hand lever 60 to any desired position between positons 96 and 97 shown in ghosted outline in FIG. 1. At the same time he can move the datum lever 64 to the same position in order to mark said position for future reference. Such movement of the hand lever 60 causes the member 51 to pivot the lever 45 about its point of connection with the wire 43 so as to vary the force of the spring 35 and to increase or decrease the pressure drop across the slide valve 32 as previously described.

When it is desired to raise the implement clear of the ground, the hand lever 60 is moved by the driver to a position 98 in which the roller 61 no longer makes contact with the member 51. If the implement is to be subsequently lowered to the same working depth as before, the driver does not move the datum lever 64. That end of the toggle lever 53 which contacts the plunger 56 is then caused to abut against the valve housing 31 by the action of the spring 52 on the rod 50. Thus the force of the spring 35 is at a maximum and the pilot valve is closed so that the slide valve 32 is also closed. Since the valve member 16 is closed, the pressure in the conduit 12 and thus in the cylinder 13 increases to a value sufficient to lift the implement. During the last few degrees of rocking movement of the shaft 24, the peg 81 carried by the arm 80 engages with the cam member 75 and moves the device 73 over-centre. The spring 74 then acts through the arm 67, rod 66, arm 65, shaft 22, arm 21, rod 20, bell crank lever 19, rod 18 and fork 17 to throw open the valve member 16 and permit the oil delivered by the pump 10 to be discharged back into the sump 11. The oil contained in the hydraulic system will be locked there by the non-return valve 15 and the slide valve 32 to hold the implement in its raised position. If any leakage of oil should occur to cause the implement to fall below a certain height, however, the over-centre device 73 will operate to effect the closure of the valve member 16, whereupon the oil delivered by the pump 10 will be forced past the non-return valve 15 to the hydraulic cylinder 13. When sufficient oil has been admitted to said cylinder to cause the implement to be returned to the fully raised position, the over-centre device will again operate to open the valve member 16 and permit the oil delivered by the pump 10 to be discharged directly to the sump 11 as previously described.

When it is desired to lower the implement to the same working depth as before, the hand lever 60 is returned by the driver into alignment with the datum lever 64 whereupon the force of the spring 35 is reduced to the same value as before and the slide valve 32 thus re-opens to produce the same pressure drop as before between the conduit 30 and the sump 11. As the implement descends due to the oil in the hydraulic cylinder 33 escaping past the slide valve 32, the over-centre device 73 operates to close the valve member 16. If, however, the implement is light in weight or the soil is hard it may be found that the implement does not penetrate the soil sufficiently quickly. To remedy this, the hand lever 60 is moved by the driver into a position 99 shown in ghosted outline in FIG. 1. This causes the projection 84 on the hand lever to abut against one end of the rod 83 and move said rod longitudinally against the action of the spring 88. The other end of the rod 83 thus abuts against the projection 85 on the arm 65 and the resulting angular movement of the shaft 22, against the action of the spring 70, acts through the arm 21, rod 20, bell crank lever 19, rod 18 and fork 17 to open the valve member 16 so as to permit the oil delivered by the pump 10 to be discharged directly to the sump 11. At the same time, the movement of the hand lever 60 to the position 99 acts through the roller 61, member 51, lever 45, roller 49, rod 50, flange 58 and toggle lever 57 to throw the slide valve 32 fully open and permit the pressure in the hydraulic system to fall to zero. When the implement has penetrated to the required depth, the hand lever 60 is moved back into alignment with the datum lever 64. The valve member 16 is thus permitted to close and the implement is again brought under the control of the valves in the housing 31.

The operation of the mechanism as a weight transfer system, without its being influenced by the draft force exerted on the implement, is as follows:

The shaft 78 remains drivably coupled to the shaft 24 and communication through the valve chest 89 between the pump 10 and cylinder 13 is maintained. The abutment 47 for that end of the casing 46 which is remote from the valve housing 31 is disconnected from the peg 48 and secured on the peg 93 carried by the fixed part 92, whilst that end of the wire 43 which is remote from the lever 45 is disconnected from the projection 44 and connected to the projection 95 also carried by said fixed part. Thus that end of the wire 43 which is connected to the lever 45 forms a fixed pivot point for said lever, and variations in the draft force exerted on the implement have no effect on the mechanism. An implement having its own depth-regulating means such as a wheel or skid must be employed, and that mark on the datum lever 64 adjacent which the words "weight transfer" are stamped is aligned with the mark on the arm 59. When the hand lever 60 is aligned with the datum lever 64 it will then occupy a position 100 shown in full lines in FIG. 3. In this position of the hand lever, the disposition of the member 51, lever 45, rod 50, toggle lever 53 and plunger 56 is such that the force of the spring 35 is zero. The valve member 16 is held closed by its spring. Thus the pressure at the rear of the slide valve 32 is controlled solely by the setting of the screwed adjusting member 38, so that a predetermined pressure is maintained in the system whereby a predetermined constant amount of weight is transferred from the implement to the tractor without affecting the working depth of the implement, which continues to be controlled by its depth-regulating means.

The hand lever 60 can also be moved to a position 101 shown in ghosted outline in FIG. 3, said position coinciding with the position 98 in FIG. 1. The result of so doing is exactly the same as when the mechanism is operated as a depth control system, that is to say the force of the spring is at a maximum so that the slide valve 32 is closed to effect raising of the implement. During the last few degrees of rocking movement of the shaft 24, the over-centre device 73 is actuated to cause the valve member 16 to be raised from its seat as previously described.

Movement of the hand lever 60 to a position 102 shown in ghosted outline in FIG. 3 acts through the roller 61, member 51, lever 45, roller 49, rod 50, flange 58 and toggle lever 57 to throw the slide valve 32 fully open and cause the oil pressure in the system to fall to zero. Thus the implement can descend to its working position determined by its depth-regulating means. At the same time, the projection 84 on the hand lever 60 causes the rod 83 to act through the arm 65, shaft 22, arm 21, rod 20, bell crank lever 19, rod 18 and fork 17 to maintain the valve member 16 in open position. The implement may be operated with the hand lever 60 in the position 102, that is to say with zero oil pressure in the hydraulic system, until such time as spinning of the driving wheels is encountered due to slippery ground conditions, a steep gradient, or the like. The hand lever 60 is then moved into the position 100 in alignment with the datum lever 64, whereupon an amount of weight depending upon the setting of the screwed adjusting member 38 is transferred from the implement to the tractor for as long as may be necessary, after which the hand lever is returned to the position 102 and the pressure in the system reverts to zero.

The operation of the hydraulic mechanism to raise, hold in any desired position, or lower any implement or other apparatus actuated either by the hitch linkage of the tractor or by an auxiliary hydraulic cylinder, without the hydraulic mechanism being influenced by any draft force exerted on the implement and without the hydraulic mechanism transferring any weight to the tractor, is as follows:

The shaft 78 is uncoupled from the shaft 24 by sliding it axially in the direction of arrow 103 and then rotating it in the direction of arrow 104 by means of the selector lever 79, the arrows 103 and 104 being shown in FIG. 1. This disconnects the tongue and groove connection 82 between said shafts, and ensures that the over-centre device 73 and arm 67 occupy the position shown in FIG. 1, if they were not already in this position. It should be noted that the peg 81 is long enough to contact the cam member 75 even when the shaft 78 has been uncoupled from the shaft 24. Subsequent movement of the shaft 24 cannot affect the valve member 16. The abutment 47 is secured on the peg 94 carried by the fixed part 92, whilst that end of the wire 43 which is remote from the lever 45 is connected to the projection 95 also carried by said fixed part. Thus that end of the wire 43 which is connected to the lever 45 forms a fixed pivot point for said lever, the position occupied by said point differing from the position it occupies when the mechanism is operated as a weight transfer system. Communication is established through the valve chest 89 between the pump 10 and the desired one of the three outlet conduits of said valve chest. Thus oil can be delivered to the cylinder 13 to actuate an implement mounted on the tractor hitch linkage, or to an auxiliary hydraulic cylinder (not shown) forming part of apparatus such as a tractor-mounted loading shovel, bulldozer or hydraulic tipping trailer. When the hand lever 60 is in a position 105 shown in full lines in FIG. 4, the implement or other apparatus is in lowered position, the roller 61 having acted through the member 51, lever 45, roller 49, rod 50, flange 58 and toggle lever 57 to move the slide valve 32 into fully opened position, and the projection 84 having acted through the rod 83, arm 65, shaft 22, arm 21, rod 20, bell crank lever 19, rod 18 and fork 17 to hold open the valve member 16. The pressure in the system is thus reduced to zero and oil delivered by the pump 10 is discharged directly into the sump 11.

Figure 4:
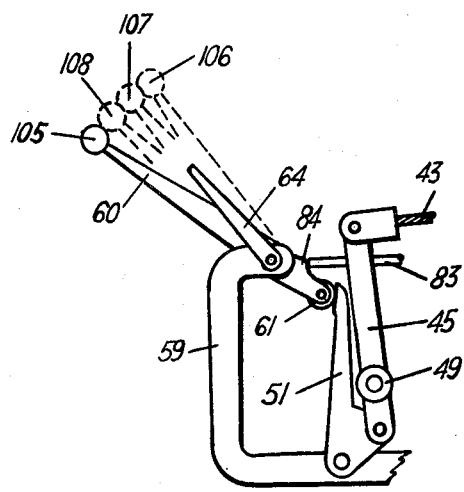
FIG. 4 shows further alternative positions of said control means.

When it is desired to raise the implement, loader bucket, bulldozer blade or the like, the hand lever 60 is moved to a position 106 shown in ghosted outline in FIG. 4. In this position the projection 84 no longer makes contact with the rod 83, and the action of the springs 88 and 70 is such that the valve member 16 is permitted to close. There is also no contact between the roller 61 and the member 51, and the force of the spring 35 is thus at a maximum due to the action of the spring 52, as a result of which the slide valve 32 is caused to close. The pressure in the hydraulic system therefore increases to a value sufficient to lift the implement or other apparatus concerned.

When the implement or other apparatus has reached the fully raised position, it is necessary to move the hand lever 60 manually into a position 107 shown in ghosted outline in FIG. 4. That mark on the datum lever 64 adjacent which the word "hold" is stamped will have been aligned with the mark on the arm 59 so that the datum lever will indicate said position to the driver. The hand lever 60 may also be moved to this position when the implement or other apparatus is only partially raised, if desired. The projection 84 will then act through the rod 83 to move the shaft 22 angularly to effect the opening of the valve member 16. The oil delivered by the pump 10 is therefore discharged directly back into the sump 11. However, the position of the fixed pivot point for the lever 45, constituted by one end of the wire 43, is such that the roller 49 carried by said lever makes no contact with the end of the rod 50. Thus the slide valve 32 remains closed and the oil contained in the hydraulic system is locked there under pressure to hold the implement or other apparatus concerned in its raised or partially raised position.

If the implement or other apparatus is of a heavy nature, it can if desired be lowered at a controlled rate, to avoid jarring or breakage. To effect this, the hand lever 60 is moved to a suitable position, between the position 107 and 105, in which the roller 49 acts on the rod 50 to an extent insufficient to actuate the slide valve 32 by means of the toggle lever 57 but sufficient to reduce the force of the spring 35. Thus the pilot valve opens and causes the slide valve 32 to open so as to reduce the pressure in the system to a value which permits the implement or other apparatus to descend at the desired speed. A typical position of the hand lever 60, for effecting a controlled rate of drop, is shown in ghosted outline at 108 in FIG. 4. When the implement or other apparatus has reached its lowered position the hand lever is moved by the driver to the position 105 to reduce the pressure in the system to zero.

It will be apparent that apparatus such as a push-off stacker which requires a movement other than a raising movement can equally well be operated by the hydraulic mechanism in the manner last described.

What is claimed is:

1. In apparatus for combination with a tractor adapted to have an implement hitched thereto and having mechanism for raising and lowering said implement between idle and working positions respectively, said apparatus comprising a power driven pump connected into a substantially closed hydraulic circuit, hydraulic means adapted to be operably connected to said implement raising and lowering mechanism and connected to be actuated by liquid pressure at the discharge side of the pump, a differential pressure-responsive valve in said circuit for controlling the escape of liquid from said hydraulic means to sump, a spring-closed pilot valve for controlling the pressure drop across said differential pressure-responsive valve, means for controlling the force of the spring of said pilot valve in response to variations in the draft force exerted by the tractor on an implement hitched thereto, and further valve means for preventing the liquid pressure acting on the hydraulic means from falling below a predetermined value.

2. In apparatus for combination with a tractor adapted to have an implement hitched thereto and having mechanism for raising and lowering said implement between idle and working positions respectively, said apparatus comprising a power driven pump connected into a substantially closed hydraulic circuit, hydraulic means adapted to be operably connected to said implement raising and lowering mechanism and connected to be actuated by liquid pressure at the discharge side of the pump, a differential pressure responsive slide valve in said circuit for controlling the escape of liquid from said hydraulic means to sump, a spring-closed pilot valve for controlling the pressure drop across said slide valve, means for controlling the force of the spring of said pilot valve in response to variations in the draft force exerted by the tractor on an implement hitched thereto, manually operable means for additionally controlling the force of said spring, and further valve means for preventing the liquid pressure acting on the hydraulic means from falling below a predetermined value.

3. In apparatus for combination with a tractor adapted to have an implement hitched thereto and having mechanism for raising and lowering said implement between idle and working positions respectively, said apparatus comprising a power driven pump connected into a substantially closed hydraulic circuit, hydraulic means adapted to be operably connected to said implement raising and lowering mechanism and connected to be actuated by liquid pressure at the discharge side of the pump, a differential pressure responsive slide valve in said circuit for controlling the escape of liquid from said hydraulic means to sump, a spring-closed pilot valve for controlling the pressure drop across said slide valve, means for controlling the force of the spring of said pilot valve in response to variations in the draft force exerted by the tractor on an implement hitched thereto, manually operable means for additionally controlling the force of said spring, further valve means for preventing the liquid pressure acting on the hydraulic means from falling below a predetermined value, and means for adjusting said further valve means to vary its effect upon the liquid pressure acting on the hydraulic means.

4. In apparatus for combination with a tractor adapted to have an implement hitched thereto and having mechanism for raising and lowering said implement between idle and working positions respectively, said apparatus comprising a power driven pump connected into a substantially closed hydraulic circuit, hydraulic means adapted to be operably connected to said implement raising and lowering mechanism and connected to be actuated by liquid pressure at the discharge side of the pump, a differential pressure responsive slide valve in said circuit for controlling the escape of liquid from said hydraulic means to sump, a spring-closed pilot valve for controlling the pressure drop across said slide valve, means for controlling the force of the spring of said pilot valve in response to variations in the draft force exerted by the tractor on an implement hitched thereto, further valve means for preventing the liquid pressure acting on the hydraulic means from falling below a predetermined value, and over-riding manually operable means for enabling the liquid pressure acting on the hydraulic means to be reduced to zero.

5. In apparatus for combination with a tractor adapted to have an implement hitched thereto and having mechanism for raising and lowering said implement between idle and working positions respectively, said apparatus comprising a power driven pump connected into a substantially closed hydraulic circuit, hydraulic means adapted to be operably connected to said implement raising and lowering mechanism and connected to be actuated by liquid pressure at the discharge side of the pump, a differential pressure responsive slide valve in said circuit for controlling the escape of liquid from said hydraulic means to sump, a spring-closed pilot valve for controlling the pressure drop across said slide valve, means for controlling the force of the spring of said pilot valve in response to variations in the draft force exerted by the tractor on an implement hitched thereto, further valve means for preventing the liquid pressure acting on the hydraulic means from falling below a predetermined value, and manually operable means adapted for connection to said circuit in such manner that the implement can be raised, held in any desired position, or lowered by appropriate movement of said manually operable means.

6. In apparatus for combination with a tractor adapted to have an implement hitched thereto and having mechanism for raising and lowering said implement between idle and working positions respectively, said apparatus comprising a power driven pump connected into a substantially closed hydraulic circuit, hydraulic means adapted to be operably connected to said implement raising and lowering mechanism and connected to be actuated by liquid pressure at the discharge side of the pump, a differential pressure responsive slide valve in said circuit for controlling the escape of liquid from said hydraulic means to sump, a spring-closed pilot valve for controlling the pressure drop across said slide valve, motion transmitting means connected to said pilot valve and adapted for operative connection to the implement for controlling the force of the spring of said pilot valve in response to variations in the draft force exerted by the tractor on said implement, further valve means for preventing the liquid pressure acting on the hydraulic means from falling below a predetermined value and connected in series with said pilot valve, a non-return valve connected in the hydraulic circuit between the pump and said hydraulic means, and relief valve means on the pump side of said non-return valve for discharging liquid delivered by the pump direct to sump.

7. In apparatus for combination with a tractor adapted to have an implement hitched thereto and having mechanism for raising and lowering said implement between idle and working positions respectively, said apparatus comprising a power driven pump connected into a substantially closed hydraulic circuit, hydraulic means adapted to be operably connected to said implement raising and lowering mechanism and connected to be actuated by liquid pressure at the discharge side of the pump, a differential pressure responsive slide valve in said circuit for controlling the escape of liquid from said hydraulic means to sump, a spring-closed pilot valve for controlling the pressure drop across said slide valve, motion transmitting means connected to said pilot valve and adapted for operative connection to the implement for controlling the force of the spring of said pilot valve in response to variations in the draft force exerted by the tractor on said implement, further valve means for preventing the liquid pressure acting on the hydraulic means from falling below a predetermined value and connected in series with said pilot valve, a non-return valve connected in the hydraulic circuit between the pump and said hydraulic means, relief valve means on the pump side of said non-return valve for discharging liquid delivered by the pump direct to sump, and means for automatically opening said relief valve means when the implement attains a fully raised position and for automatically closing said relief valve means when the implement is lowered from said fully raised position.

8. In apparatus for combination with a tractor adapted to have an implement hitched thereto and having mechanism for raising and lowering said implement between idle and working positions respectively, said apparatus comprising a power driven pump connected into a substantially closed hydraulic circuit, hydraulic means adapted to be operably connected to said implement raising and lowering mechanism and connected to be actuated by liquid pressure at the discharge side of the pump, a slide valve in said circuit for controlling the escape of liquid from said hydraulic means to sump, a spring-closed pilot valve for controlling the pressure drop across said slide valve, motion transmitting means connected to said pilot valve and adapted for operative connection to the implement for controlling the force of the spring of said pilot valve in response to variations in the draft force exerted by the tractor on said implement, further valve means for preventing the liquid pressure acting on the hydraulic means from falling below a predetermined value and connected in series with said pilot valve, a non-return valve connected in the hydraulic circuit between the pump and said hydraulic means, relief valve means on the pump side of said non-return valve for discharging liquid delivered by the pump direct to sump, means including over-center means for automatically opening said relief valve means when the implement obtains a fully raised position and for automatically closing said relief valve means when the implement is lowered from said fully raised position.

9. In apparatus for combination with a tractor adapted to have an implement hitched thereto and having mechanism for raising and lowering said implement between idle and working positions respectively, said apparatus comprising a power driven pump connected into a substantially closed hydraulic circuit, hydraulic means adapted to be operably connected to said implement raising and lowering mechanism and connected to be actuated by liquid pressure at the discharge side of the pump, a slide valve in said circuit for controlling the escape of liquid from said hydraulic means to sump, a spring-closed pilot valve, connected in series with the slide valve by way of an axial hole passing through the latter, for controlling the pressure drop across said slide valve, motion transmitting means connected to said pilot valve and adapted for operative connection to the implement for controlling the force of the spring of said pilot valve in response to variations in the draft force exerted by the tractor on said implement, further valve means for preventing the liquid pressure acting on the hydraulic means from falling below a predetermined value and connected in series with said pilot valve, a non-return valve connected in the hydraulic circuit between the pump and said hydraulic means, relief valve means on the pump side of said non-return valve for discharging liquid delivered by the pump direct to sump, means including over-center means for automatically opening said relief valve means when the implement obtains a fully raised position and automatically closing said relief valve means when the implement is lowered from fully raised position.

10. In an apparatus for combination with a tractor adapted to have an implement hitched thereto and having a mechanism for raising and lowering said implement between idle and working positions respectively, said apparatus comprising: a power driven pump connected into a substantially closed hydraulic circuit with a reservoir disposed in said hydraulic circuit and connected to the intake of said pump, hydraulic means adapted to be operably connected to said implement raising and lowering mechanism and connected to be actuated by liquid pressure at the discharge side of said pump, a differential pressure-responsive valve means disposed in said circuit between said hydraulic means and said reservoir for displacement by line fluid pressure for controlling the escape of liquid from said hydraulic means to said reservoir, a pilot valve disposed in said circuit downstream of said differential pressure responsive valve means and having a closure member positionable for controlling the pressure differential applied across said differential pressure-responsive valve means to thereby govern the displacement of said differential pressure responsive valve means, and means for automatically controlling the position of said closure member in response to variations in the draft force exerted by the tractor on said implement whereby said pressure differential is governed in predetermined relation to said variations in draft force, said circuit being provided with two parallel branch passages on the discharge side of said pump in fluid communication with said reservoir, one of said branch passages containing said pilot valve closure member and the other of said branch passages establishing fluid communication between said hydraulic means and said reservoir when said differential pressure responsive valve means is in open position.

11. The apparatus defined in claim 10 comprising further valve means disposed in said one branch passage between said reservoir and said pilot valve for preventing the liquid pressure from falling below a predetermined magnitude, said further valve means, said pilot valve and said differential pressure responsive valve means being mutually disposed in series relationship in said circuit.

12. The apparatus defined in claim 10 wherein said differential pressure-responsive valve means comprises a line pressure displaced member having opposed upstream and downstream faces exposed to the liquid pressure in said circuit, a valve seat at one end of said member, spring means urging said member into valve closed engagement with said seat and through passage means in said member providing uninterrupted fluid communication between the upstream and downstream sides of said member.

13. In an apparatus for combination with a tractor adapted to have an implement hitched thereto and having a mechanism for raising and lowering said implement between idle and working positions respectively, said apparatus comprising: a power driven pump connected into a substantially closed hydraulic circuit with a reservoir disposed in said hydraulic circuit and connected to the intake of said pump, hydraulic means adapted to be operably connected to said implement raising and lowering mechanism and connected to be actuated by liquid pressure at the discharge side of said pump, a differential pressure responsive valve means disposed in said circuit between said hydraulic means and said reservoir for displacement by line fluid pressure for controlling the escape of liquid from said hydraulic means to said reservoir, a pilot valve disposed in said circuit downstream of said differential pressure responsive valve means and having a closure member positionable for controlling the pressure differential applied across said differential pressure responsive valve means to thereby govern the displacement of said differential pressure responsive valve means, means for automatically controlling the position of said closure member in response to variations in the draft force exerted by the tractor on said implement whereby said pressure differential is governed in predetermined relation to said variations in draft force, and manually operable means for additionally controlling the position of said closure member, said circuit being provided with two parallel branch passages on the discharge side of said pump in fluid communication with said reservoir, one of said branch passages containing said pilot valve closure member and the other of said branch passages establishing fluid communication between said hydraulic means and said reservoir when said differential pressure responsive valve means is in open position.

References Cited in the file of this patent

UNITED STATES PATENTS

| | | |
|---|---|---|
| 2,689,513 | Ferguson | Sept. 21, 1954 |
| 2,721,508 | Edman | Oct. 25, 1955 |
| 2,958,384 | Hull | Nov. 1, 1960 |
| 2,998,851 | Marindin | Sept. 5, 1961 |

FOREIGN PATENTS

| | | |
|---|---|---|
| 1,201,977 | France | July 15, 1959 |